United States Patent
Taranov et al.

(10) Patent No.: US 8,938,638 B2
(45) Date of Patent: Jan. 20, 2015

(54) RECOVERY SERVICE LOCATION FOR A SERVICE

(75) Inventors: Viktoriya Taranov, Bellevue, WA (US); Alexander Hopmann, Seattle, WA (US); Antonio Marcos Da Silva, Jr., Kirkland, WA (US); Nikita Voronkov, Redmond, WA (US); Kai Yiu Luk, Seattle, WA (US); Ramanathan Somasundaram, Bothell, WA (US); Artsiom Kokhan, Redmond, WA (US); Siddharth Rajendra Shah, Bothell, WA (US); Daniel Blood, Snohomish, WA (US); Bhavesh Doshi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 13/154,299

(22) Filed: Jun. 6, 2011

(65) Prior Publication Data

US 2012/0311376 A1 Dec. 6, 2012

(51) Int. Cl.
*G06F 11/07* (2006.01)
*G06F 17/30* (2006.01)
*G06F 11/20* (2006.01)

(52) U.S. Cl.
CPC ...... *G06F 17/30578* (2013.01); *G06F 11/2038* (2013.01); *G06F 11/2097* (2013.01); *G06F 11/2033* (2013.01); *G06F 11/2048* (2013.01)
USPC .............................. 714/4.11; 714/6.3; 714/13

(58) Field of Classification Search
USPC ............................................ 714/4.11, 6.3, 13
See application file for complete search history.

(56) References Cited

U.S. PATENT DOCUMENTS

| 7,246,275 | B2 | 7/2007 | Therrien et al. | 714/710 |
|---|---|---|---|---|
| 7,861,111 | B2 | 12/2010 | Doerr | 714/6.12 |
| 2003/0074378 | A1* | 4/2003 | Midgley et al. | 707/204 |
| 2003/0112761 | A1 | 6/2003 | Sen | |
| 2004/0153709 | A1* | 8/2004 | Burton-Krahn | 714/4 |
| 2005/0125467 | A1* | 6/2005 | Oosaki et al. | 707/204 |
| 2005/0149528 | A1* | 7/2005 | Anderson et al. | 707/9 |
| 2005/0216536 | A1 | 9/2005 | Stager | |

(Continued)

OTHER PUBLICATIONS

Zhang et al., "Replication Control in Distributed File Systems", Technical Report, Center for Information Technology Integration University of Michigan, 2004, pp. 1-14.*

(Continued)

*Primary Examiner* — Chae Ko
(74) *Attorney, Agent, or Firm* — Louise Bowman; Jim Ross; Micky Minhas (57) ABSTRACT

A secondary location of a network acts as a recovery network for a primary location of the service. The secondary location is maintained in a warm state that is configured to replace the primary location in a case of a failover. During normal operation, the primary location actively services user load and performs backups that include full backups, incremental backups and transaction logs that are automatically replicated to the secondary location. Information is stored (e.g. time, retry count) that may be used to assist in determining when the backups are restored correctly at the secondary location. The backups are restored and the transaction logs are replayed at the secondary location to reflect changes (content and administrative) that are made to the primary location. After failover to the secondary location, the secondary location becomes the primary location and begins to actively service the user load.

20 Claims, 4 Drawing Sheets

(56) References Cited

U.S. PATENT DOCUMENTS

| | | | | |
|---|---|---|---|---|
| 2005/0234938 | A1* | 10/2005 | Browning et al. | 707/100 |
| 2006/0047836 | A1* | 3/2006 | Rao et al. | 709/229 |
| 2006/0080353 | A1* | 4/2006 | Miloushev et al. | 707/102 |
| 2006/0129562 | A1 | 6/2006 | Pulamarasetti et al. | 1/1 |
| 2006/0179083 | A1* | 8/2006 | Kulkarni et al. | 707/204 |
| 2007/0156781 | A1* | 7/2007 | Kapoor et al. | 707/202 |
| 2007/0180302 | A1* | 8/2007 | Allen et al. | 714/6 |
| 2007/0260696 | A1* | 11/2007 | Bohannon et al. | 709/208 |
| 2007/0288710 | A1* | 12/2007 | Boyd et al. | 711/162 |
| 2008/0077636 | A1* | 3/2008 | Gupta et al. | 707/204 |
| 2008/0253283 | A1 | 10/2008 | Douglis et al. | 370/228 |
| 2009/0003195 | A1 | 1/2009 | Pitchforth | |
| 2009/0083443 | A1* | 3/2009 | Ocko et al. | 709/248 |
| 2009/0100516 | A1* | 4/2009 | Ray et al. | 726/19 |
| 2010/0125712 | A1 | 5/2010 | Murase et al. | 711/162 |
| 2010/0228819 | A1 | 9/2010 | Wei | 709/203 |
| 2010/0257219 | A1* | 10/2010 | Patel et al. | 707/827 |
| 2010/0287081 | A1* | 11/2010 | Walters et al. | 705/34 |
| 2010/0332401 | A1 | 12/2010 | Prahlad et al. | 705/80 |
| 2011/0010560 | A1* | 1/2011 | Etchegoyen | 713/189 |
| 2011/0099420 | A1 | 4/2011 | McAlister et al. | |
| 2011/0167298 | A1* | 7/2011 | Lee | 714/18 |
| 2012/0036107 | A1* | 2/2012 | Miloushev et al. | 707/652 |

OTHER PUBLICATIONS

International Search Report mailed Jan. 29, 2013, in Appl. No. PCT/US2012/040624.

Haffele, et al.,; "*Disaster Recovery/High Availability Failover Plan for Vail Resorts InfoGenesis Food and Beverage Database Management System*"; Nov. 20, 2009; http://ectd.du.edu/source/uploads/19843132.pdf; 70 pgs.

Microsoft; "*Configure disaster recovery across SharePoint farms by using SQL Server log shipping*"; May 21, 2009; http://technet.microsoft.com/en-us/library/dd890507(office.12).aspx; 20 pgs.

Jones, R.; "*Survival of the Fittest: Disaster Recovery Design for the Data Center*"; Sep. 10, 2007; http://crescententerprise.net/paper/filename/13/Burton_Group_-_Survival_of_the_Fittest_-_Diaster_Recovery_Design_for_the_Data_Center.pdf; 45 pgs.

* cited by examiner

RECOVERY SERVICE LOCATION FOR A SERVICE

BACKGROUND

Web-based services include files that are located on web servers along with data that is stored in databases. For example, there are a large number of servers to handle the traffic that is directed to the service. In some cases, a service may catastrophically fail causing work to be lost. Transitioning operations to a new service can be an expensive, time consuming process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A secondary location of a network acts as a recovery network for a primary location of the service. The secondary location is maintained in a warm state that is configured to replace the primary location in a case of a failover. During normal operation, the primary location actively services user load and performs backups that include full backups, incremental backups and transaction logs that are automatically replicated to the secondary location. Information is stored (e.g. time, retry count) that may be used to assist in determining when the backups are restored correctly at the secondary location. The backups are restored and the transaction logs are replayed at the secondary location to reflect changes (content and administrative) that are made to the primary location. After failover to the secondary location, the secondary location becomes the primary location and begins to actively service the user load.

DETAILED DESCRIPTION

Referring now to the drawings, in which like numerals represent like elements, various embodiment will be described.

Generally, program modules include routines, programs, components, data structures, and other types of structures that perform particular jobs or implement particular abstract data types. Other computer system configurations may also be used, including hand-held devices, multiprocessor systems, microprocessor-based or programmable consumer electronics, minicomputers, mainframe computers, and the like. Distributed computing environments may also be used where jobs are performed by remote processing devices that are linked through a communications network. In a distributed computing environment, program modules may be located in both local and remote memory storage devices.

Figure 1:
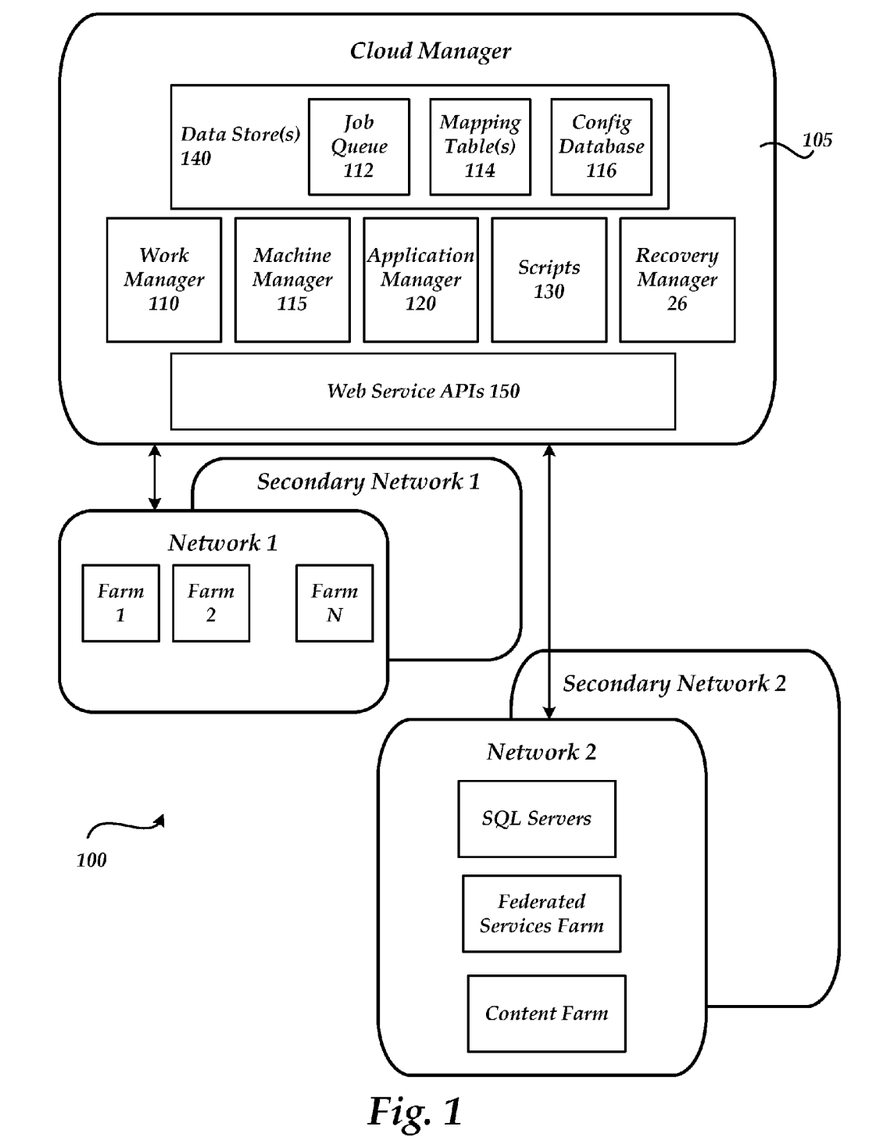
FIG. 1 illustrates a cloud management system including a recovery network at a secondary location for a service.

FIG. 1 illustrates a cloud management system including a recovery network at a secondary location for a service. The term "service" as used herein may refer to a simple service that uses a single computing device to service one or more users to a very complex cloud based service that uses thousands of computing devices that are spread throughout the world. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. As illustrated, each primary network (Network 1, Network 2) include a recovery service at a secondary location (Secondary Network 1, Secondary Network 2). Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130, recovery manager 26 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Generally, cloud manager 105 assists in deploying and managing networks for an online service, such as an online content management service. The cloud manager system is a central coordination service that receives requests to perform operations relating to configuring, updating and performing jobs in networks that are used in providing the online service. For example, the cloud manager may be called to manage assets within one or more of the networks (e.g. Servers, Farms, User Properties, and the like). The management of the assets may comprise deploying machines, updating machines, removing machines, performing configuration changes on servers, Virtual Machines (VMs), establishing and maintaining recovery networks, as well as performing other jobs relating to the management. The cloud manager is configured to provide service for attached networks even during upgrades to the cloud manager. The cloud manager is configured to receive requests through an idempotent and asynchronous application programming interface (API) that cannot rely on a reliable network.

As illustrated, Network 1 and Network 2 are live networks that are actively servicing users. Secondary Network 1 and Secondary Network 2 are secondary networks that mirror the content and configuration of the corresponding live networks. The secondary networks are not actively service users while the primary network is active. According to an embodiment, the secondary networks are kept "warm" such that the user load from the primary networks may be quickly switched to the secondary networks in case of an outage/disaster/failover.

The primary networks are configured to perform back-ups (full, incremental) including SQL transaction log backups that are routinely and frequently taken. According to an embodiment, full backups are performed weekly, incremental backups are performed daily and transaction logs are updated each five minutes (other times may be used). The backups from the primary networks (e.g. Network 1 and 2) are replicated to the secondary networks (e.g. Secondary Network 1 and 2) after they are created (e.g. Distributed File System Replication (DFSR). According to an embodiment, the secondary networks replay the transaction logs as they are received from the corresponding primary network. Administrative operations that occur on the live primary network are automatically replayed on the corresponding warm secondary network such that the primary network and the secondary network remain synchronized in a timely manner.

Work manager 110 manages the execution of jobs and enables scheduling and retry of longer running jobs. Work manager 110 starts jobs stored in job queue 112 and keeps track of running jobs. When a predetermined time has elapsed, work manager 110 may automatically cancel the task and perform some further processing relating to the task. According to one embodiment, the jobs in job queue 112 are executed by work manager 110 by invoking one or more scripts 130. For example, a scripting language such as Microsoft's PowerShell® may be used to program the jobs that are executed by work manager 110. Each script may be run as a new process. While executing each script as a new process may have a fairly high CPU overhead, this system is scalable and helps to ensure a clean environment for each script execution plus full cleanup when the script is completed.

When jobs are to be submitted at a secondary location (e.g. in response to a failover to the secondary location, a configuration change to a primary network that is to be reflected in the secondary network), work manager 110 may be used in determining the jobs that are to be submitted. For example, work manager 110 may determine the jobs that are submitted to be performed at a primary location of a service and submit corresponding jobs to the secondary location.

Machine manager 115 is configured to manage the physical machines in the networks (e.g. Network 1, Network 2, Secondary Network 1, Secondary Network 2). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 2. In response to a request to cloud manager 105, machine manager 115 locates a suitable Physical Machine that is located on Network 2 and configures the VM according to the VM Image associated with the VM's Role. The physical machine is configured with a VHD of type Foo with version 12.34.56.78 that is stored within a data store, such as data store 140. A corresponding change is made to secondary network 2. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

The configuration database 116 contains a map of each of the networks. For example, the configuration database 116 may include information relating to each of the farms, databases, site collections, and the like of a network. The configuration database 116 may include a row for each physical machine, VM, farm, and the like for each network. According to an embodiment, each VHD, Farm, and VM within a network has an associated version string.

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2) may be stored locally to that network. The scripts may be used for many different purposes. For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the jobs that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like. When a script is run at a primary location (e.g. Network 1), the script may also be run at the secondary location (e.g. Secondary Network 2) such that the primary and secondary locations are configured in a same manner.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. According to an embodiment, the primary location and the secondary location of a service are configured in the same manner.

Generally, a network may continue to grow as long as the networking limits (e.g. load balancer and network switches) are not exceeded. For example, a network may start out with ten servers and later expand to one hundred or more servers. As the primary network changes, the corresponding secondary network is automatically changed to reflect the changes made to the primary network. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 maintains records to keep track of current requests to a service. For example, cloud manager 105 updates records in a local database and if necessary schedules a "job" to perform more lengthy activity later.

Cloud manager 105 keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

According to one embodiment, the cloud manager includes a logging system that is configured to record a log entry for each web service call. A logging system may be implemented that includes as few/many features as desired.

Mapping table 114 comprises a mapping of parameters (e.g. identifiers and/or secrets) that are associated with the primary network to the secondary network. For example, there are mappings between databases, farms and networks that are associated with a primary location of a service (e.g. Primary Network 1 and 2) to the corresponding databases, farms and networks that are associated with a secondary location of a service (e.g. Secondary Network 1 and 2).

Recovery manager 26 is configured to assist in maintaining a secondary location of a network that acts as a recovery network for a primary location of the service. The secondary location is maintained in a warm state that is configured to replace the primary location in a case of a failover. During normal operation, the primary location actively services user load and performs backups that include full backups, incremental backups and transactions logs that are automatically provided to the secondary location. The filenames of the backups and transaction logs include information that may be used to assist in determining when the backups are restored correctly at the secondary location. The backups are restored and the transaction logs are replayed at the secondary location to reflect changes (content and administrative) that are made to the primary location. After failover to the secondary location, the secondary location becomes the primary location and begins to actively service the user load.

Figure 2:
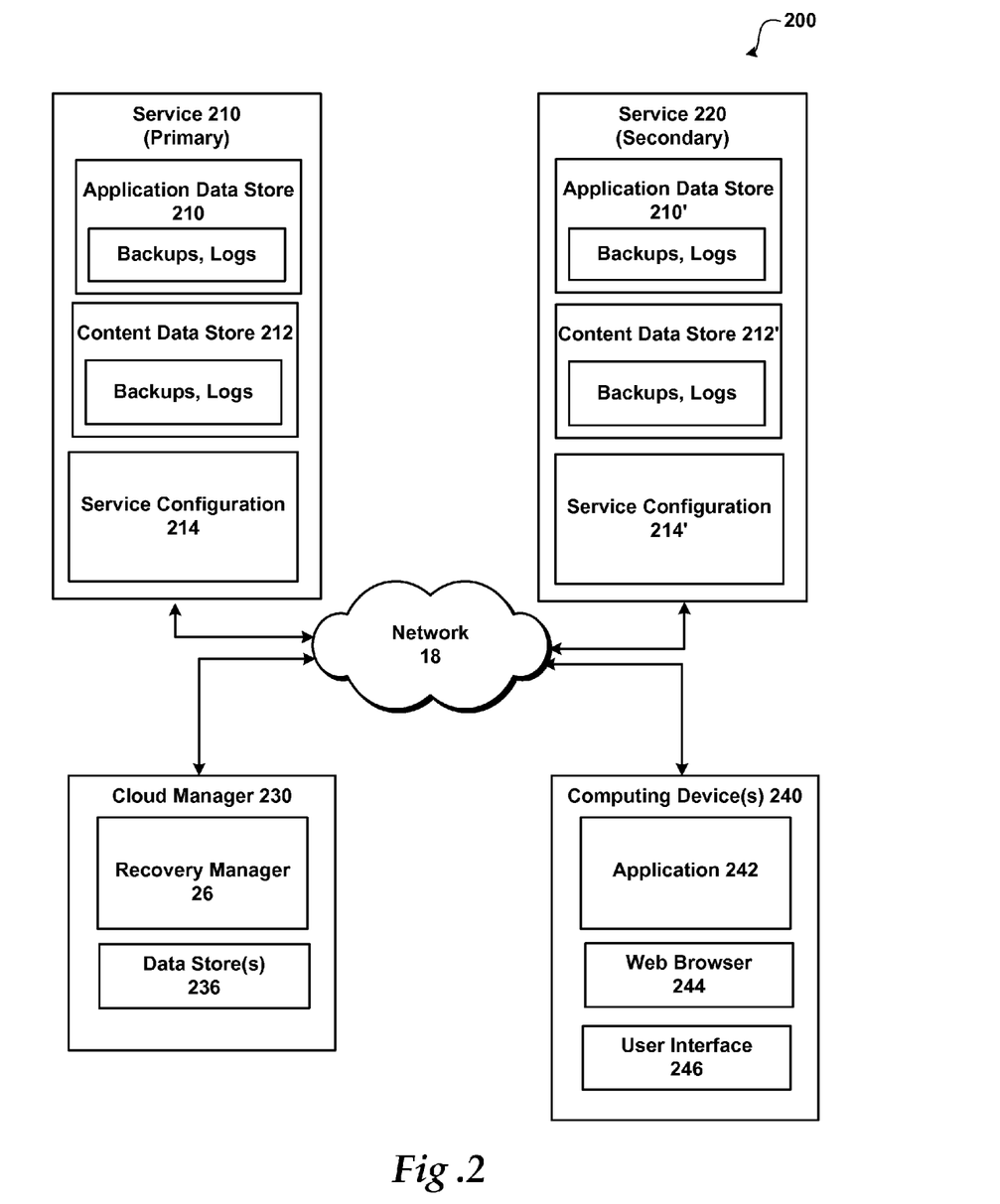
FIG. 2 shows a system including a recovery network at a secondary location for a service.

FIG. 2 shows a system including a recovery network at a secondary location for a service. As illustrated, system 200 includes primary service 210, secondary service 220, cloud manager 230 and computing device(s) 240.

The computing devices used may be any type of computing device that is configured to perform the operations relating to the use of the computing device. For example, some of the computing devices may be: mobile computing devices (e.g. cellular phones, tablets, smart phones, laptops, and the like); some may be desktop computing devices and other computing devices may be configured as servers. Some computing devices may be arranged to provide an online cloud based service (e.g. service 210 and service 220), some may be arranged as data shares that provide data storage services, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as service 210, service 220, cloud manager 230 and computing device(s) 240.

Computing device(s) 240 includes application 242, Web browser 244 and user interface 246. As illustrated, computing device 240 is used by a user to interact with an online service, such as service 210. According to an embodiment, service 210 and 220 is a multi-tenancy service. Generally, multi-tenancy refers to the isolation of data (sometimes including backups), usage and administration between customers. In other words, data from one customer (tenant 1) is not accessible by another customer (tenant 2) even though the data from each of the tenants may be stored within a same database within the same data store.

User interface (UI) 246 is used to interact with various applications that may be local/non-local to computing device 240. One or more user interfaces of one or more types may be used to interact with content. For example, UI 246 may include the use of a context menu, a menu within a menu bar, a menu item selected from a ribbon user interface, a graphical menu, and the like. Generally, UI 246 is configured such that a user may easily interact with functionality of an application. For example, a user may simply select an option within UI 246 to request an action from the service.

As illustrated, content data stores 212 and 212' include tenant data, including corresponding backup data and logs, for different tenants. Application data store 210 includes application data, including corresponding backup data and logs for different applications that are associated with the service. A data store may store all/portion of a tenant's/application's data. For example, some tenants/applications may use more than one data store, whereas other tenants/applications share the data store with many other tenants/applications. While the corresponding backup data for a tenant/application is illustrated within the same data store, the backup data may be stored at other locations. For example, one data store may be used to store tenant data and one or more other data stores may be used to store the corresponding backup data. Similarly, backups and logs for one or more applications may be stored in different data stores. Generally, the data in data store 212' and data store 210' is a mirror of the data in data store 212 and data store 210.

Changes made to data that is associated with the primary service 210 (i.e. data relating to administrative changes and tenant data) is mirrored to the secondary service 220. According to an embodiment, full backups (e.g. weekly), incremental backups (e.g. hourly, daily) and transaction logs are used in maintaining the changes made. According to an embodiment, the changes made to the primary service are copied to the secondary service such that the secondary service remains substantially synchronized with the primary service (e.g. within five, ten minutes). Periodically, the data that is copied to the secondary service is verified to help ensure that the data has been correctly replicated. Different methods may be used to perform the verification (e.g. checksums, hash functions, and the like). Data store 236 includes data relating to operation and/or configuration of the service (e.g. service 210, service 220). For example, data store 236 may comprise a job queue, mapping table and/or configuration database.

According to an embodiment, DFSR is used to automatically copy content from primary service 210 to service 220. DFSR uses Remote Differential Compression (RDC). Generally, RDC detects insertions, removals, and rearrangements of data in files, enabling DFSR to replicate the deltas (changes) when files are updated. The DFSR service uses RPC to communicate between servers. It replicates a folder scope defined by the replicated folder path. The set of computers participating in replication is defined by a configured topology of connections and is called a replication group. Multiple replicated folders can be included in a replication group, with memberships selectively enabling or disabling specific replicated folders. The DFSR service uses Windows Management Instrumentation (WMI) to configure server-wide parameters, while global parameters and certain replicated folder-specific parameters are configured using Active Directory. DFSR also uses WMI to expose monitoring information regarding specific objects such as replicated folders and connections. According to an embodiment, DFSR is configured to have a staging area sized to handle a large amount of data and to move the data in a one-way direction from the primary service 210 to the secondary service 220. The file shares at the primary location and the secondary location may have different names.

According to an embodiment, Active Directory (AD) replication is used to synchronize Directory Services data between the primary service 210 and the secondary service 220. Other file replication methods may be used in place of DFSR and AD.

Service 210 is configured as a primary location for an online service that is configured to provide services relating to displaying an interacting with data from multiple tenants. Service 210 provides a shared infrastructure for multiple tenants. According to an embodiment, the service 210 is MICROSOFT'S SHAREPOINT ONLINE service. Different tenants may host their Web applications/site collections using service 210. A tenant may also use a dedicated alone or in combination with the services provided by service 210. Service 220 is configured as a secondary location for a service that is substantially a mirror of service 210.

Recovery manager 26 is configured assist in establishing, maintaining and transitioning operations to the secondary location. For example, recovery manager 26 may be used in the management of the synchronization between the primary service 210 and the secondary service 220. Recovery manager 26 stores information to help ensure that logs and backups are transferred and replayed correctly. For example, the information may include a time (e.g. UTC time) the log/backup was made such that the logs and backups may be sorted and arranged according to their time. The information may also include other information, such as a database name the backup/log was made from and a retry count. The retry count is a value that is changed when the backup/log is read in order to be replayed/restored. For example, when a log is accessed to be replayed, recovery manager 26 increments the value of the retry count. When the retry count exceeds a predetermined value (e.g. 2, 3, 4 attempts), recovery manager 26 may trigger an alert and attempt to address the problem with the log/backup. A time limit may also be used to help ensure that logs are replayed in a timely manner. For example, when a log is older than some amount of time (e.g. 5, 10, 15 minutes), recovery manager 26 may trigger an alert and attempt to address the problem with the log/backup. This information may be stored in different locations. For example, the information may be stored in a backup folder and/or in some other location that is accessible by replay manager 26. According to an embodiment, the filenames of the logs may include some/all of the information to help ensure that logs and backups are transferred and replayed correctly. For example, a filename may take the form "database_year_month_day_hour_minutes_seconds_tlog_retry count."

Once an alert is raised by recovery manager 26, the alert is also raised on any successive retries. The alert indicates the amount of time since the last successful restore. The level of the alert may change (i.e. to a critical level from a failure level) after some determined time has elapsed (e.g. 30 minutes).

Upon an alert, a check may be performed (manually/automatically) to see if the log/backup exists at the primary location and is not getting copied to the secondary location. When the log/backup does not exist it can be recreated and/or another backup may be created.

According to an embodiment, the alert includes the following message string: Event Source: DR Log Replay; Event ID: For database [<dbname>] there is a missing transaction log between [<timestamp UTC>] and the transaction log [<full path to file>.] It has been [<N>] minutes since the last successful restore. The error SQL provided while restoring is: <SQL Error Number <SQL Error Message>.

Recovery manager 26 is also configured to detect when a transaction log is not received for a period of time (e.g. within the last 15 minutes. In this case, recovery manager 26 may check the back-up jobs at the primary location and determine: are the backups paused? (e.g. a maintenance procedure such as Database move and Database upgrade may pause the backup process. A check may also be performed (manually/automatically) to see if the log/backup exists at the primary location and is not getting copied to the secondary location.

According to an embodiment, when a log/backup is not received for a period of time, the Alert includes the following message string: Event Source: DR Log Replay; Event ID: For database [<dbname>] there have been no new transaction logs in the last [<N>] minutes.

When the secondary location fails to restore one of the logs due to corruption, an alert is raised by recovery manager 26. To handle the potentially common case of logs being partially written due to a failover in the middle of generating the backup, the replay job attempts to restore the "next" log in time. If the "next" log is successfully restored, recovery manager 26 ignores the failure. According to an embodiment, the log is retried for 3 times, or 15 minutes, before recovery manager 26 raises the alert. Once the alert is raised it will continue raising it on successive retries. The alert indicates the amount of time since the last successful restore. When a log is not restored, recovery manager 26 perform a full back-up of the database at the primary location, deletes the corresponding database at the secondary location and site and recreates the corresponding database at the secondary location by obtaining a copy of the data at the secondary location from the primary location. According to another embodiment, the replay job may be paused and the most recent set of backups and logs may be restores the attempt to move past the hole in chain. According to an embodiment, the alert in this situation comprises the following message string: Event Source: DR Log Replay; Event ID: Errors occurred for database [<dbname>] while restoring the transaction log [<full path to file>.] It has been [<N>] minutes since the last successful restore. The error SQL provided while restoring is: <SQL Error Number><SQL Error Message>.

Figure 3:
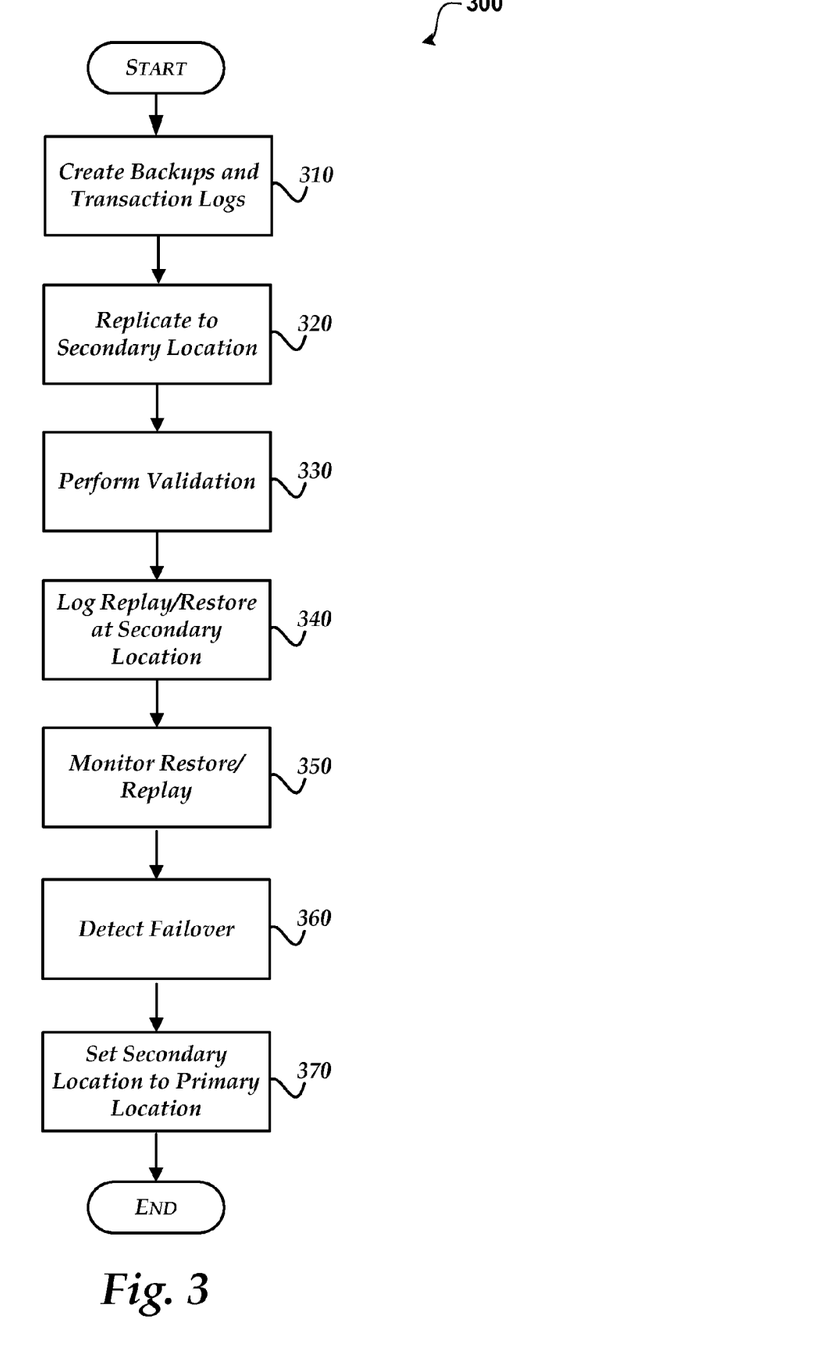
FIG. 3 illustrates a process for maintaining and failing over to a secondary location of a service.

Referring now to FIG. 3, a process for maintaining and failing over to a secondary location of a service will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process 300 flows to operation 310, where backups and transaction logs are created at the primary location. According to an embodiment, the backups include full backups performed weekly, incremental backups performed daily and SQL transaction logs every five minutes (other times may be used). Some backups may be configured to not include incremental backups and/or logs. For example, an application/service provided by the service (e.g. search) may include fewer backups and/or backups/logs performed at different times. Information relating to the backups/logs is stored to assist in the logs and backups being transferred and replayed correctly. For example, the information may include a time (e.g. UTC time) the log/backup was made such that the logs and backups may be sorted and arranged according to their time. The information may also include other information, such as a database name the backup/log was made from and a retry count. The retry count is a value that is changed when the backup/log is read in order to be replayed/restored. The retry count is updated when the log is accessed to be replayed.

Moving to operation 320, the backups and logs are replicated to the secondary location for the service. According to an embodiment, the backups and logs are automatically replicated as soon as they are finished using DFSR and AD based algorithms.

Flowing to operation 330, the content replicated to the secondary location is validated. Different methods may be used to validate that the content has been correctly replicated to the secondary location. For example, hashes, hashes+property of the files may be used to determine if the content has been correctly copied to the secondary location. When the content is not validated, the content may be recreated/recopied to the secondary location.

Transitioning to operation 340, the backups are restored at the secondary location and the logs are replayed at the secondary location. According to an embodiment the logs are replayed as soon as they are replicated to the secondary location such that the secondary location remains synchronized with the primary location.

Moving to operation 350, the restore/replay operations are monitored to help ensure that the content and actions are correctly performed at the secondary location. An alerting mechanism alerts a user and/or automatically performs operations to address a problem that occurs when restoring/replaying backups/logs. For example, the alerting mechanism is configured to create an alert when: a log/backup has not been received according to a predetermined schedule; a backup/log is corrupted; a backlog of backups/logs exist; and the like.

Flowing to operation 360, a failover is detected. The failover may be detected in response to a planned/unplanned event. For example, the failover may be caused by a catastrophic failure at a primary network or may be caused by a determination to stop using a primary network. The failover event may be initiated manually/automatically. For example, an authorized user may trigger the failover from the primary network to the secondary network or the failover may be automatically triggered based on the detection of one or more conditions (e.g. failure of one or more machines).

Flowing to operation 370, the secondary location is set as the primary location after the failover. According to an embodiment, the secondary location receives the requests directed to the primary location after the secondary location is synchronized with the primary location. When the secondary location becomes the primary location, mirroring is established at the secondary location and another recovery network may be established for the new primary location.

The process then moves to an end operation and returns to processing other actions.

Figure 4:
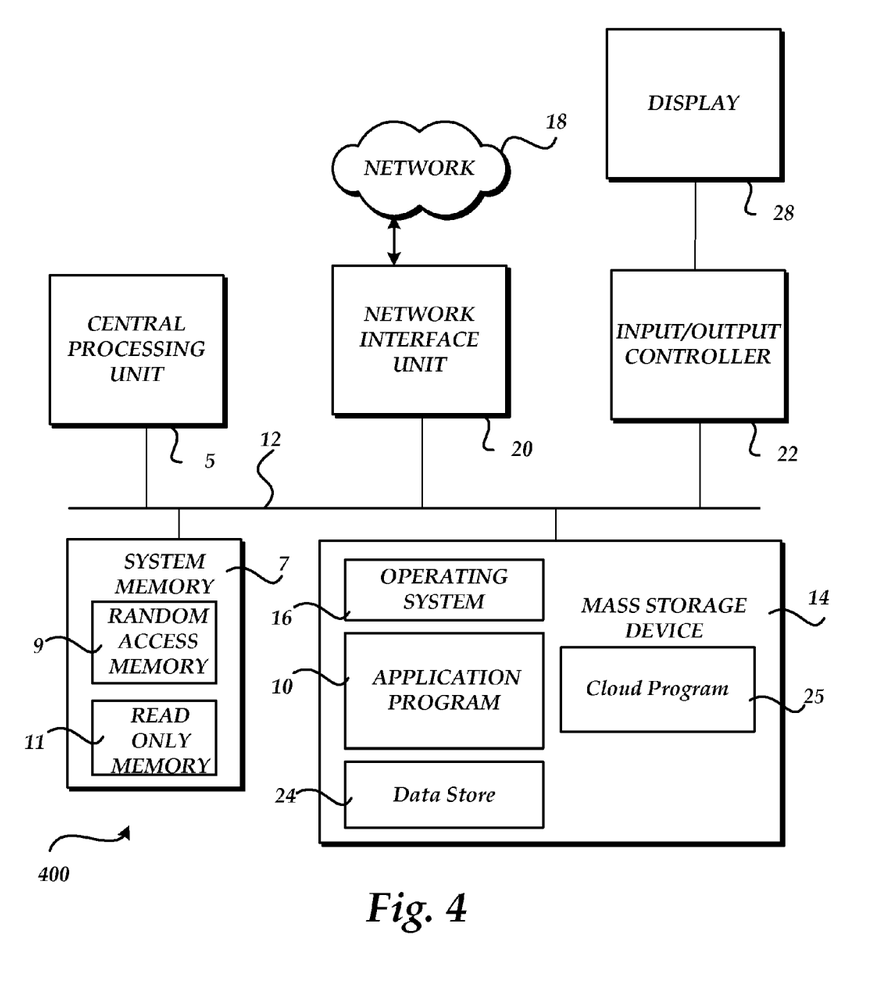
FIG. 4 shows an illustrative computer architecture.

Referring now to FIG. 4, an illustrative computer architecture for a computer 400 utilized in the various embodiments will be described. The computer architecture shown in FIG. 4 may be configured as a server, a desktop or mobile computer and includes a central processing unit 5 ("CPU"), a system memory 7, including a random access memory 9 ("RAM") and a read-only memory ("ROM") 11, and a system bus 12 that couples the memory to the central processing unit ("CPU") 5.

A basic input/output system containing the basic routines that help to transfer information between elements within the computer, such as during startup, is stored in the ROM 11. The computer 400 further includes a mass storage device 14 for storing an operating system 16, application programs 10, data store 24, files, and a cloud program 25 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 400. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 400.

According to various embodiments, computer 400 may operate in a networked environment using logical connections to remote computers through a network 18, such as the Internet. The computer 400 may connect to the network 18 through a network interface unit 20 connected to the bus 12. The network connection may be wireless and/or wired. The network interface unit 20 may also be utilized to connect to other types of networks and remote computer systems. The computer 400 may also include an input/output controller 22 for receiving and processing input from a number of other devices, including a keyboard, mouse, or electronic stylus (not shown in FIG. 4). Similarly, an input/output controller 22 may provide output to a display screen 28, a printer, or other type of output device.

As mentioned briefly above, a number of program modules and data files may be stored in the mass storage device 14 and RAM 9 of the computer 400, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 25, that perform jobs relating to the cloud system.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for establishing and maintaining a recovery service location for a service, comprising:
   synchronizing a primary location of a service that is a web-based service that performs jobs for different tenants and maintains data for the different tenants with a secondary location of the service while the primary location of the service is actively receiving requests from users to perform actions relating to displaying and interacting with data from the web-based service, wherein the secondary location of the service is substantially configured the same as the primary location of the service and is updated as the primary location is updated, wherein synchronizing the primary location of the service with the secondary location of the service comprises storing a time of a backup in a sortable format including a read count that is updated when the backup is read and storing a name of a database;
   detecting a network failure of the primary location of the service; and
   setting the secondary location of the service as the primary location in response to the network failure.

2. The method of claim 1, wherein synchronizing the primary location of the service with the secondary location of the service comprises creating full backups, incremental backups that are created between the full backups and transaction logs.

3. The method of claim 1, wherein synchronizing the primary location of the service with the secondary location of the service comprises maintaining tenant data separately from application data for the service.

4. The method of claim 2, wherein synchronizing the primary location of the service with the secondary location of the service comprises replaying the transaction logs as they are received at the secondary location of the service.

5. The method of claim 1, further comprising establishing mirroring for the secondary location of the service after switching the requests from the primary location to the secondary location.

6. The method of claim 1, further comprising verifying an integrity of the synchronization at the secondary location.

7. The method of claim 1, wherein synchronizing the primary location of the service with the secondary location of the service comprises using Distributed File System Replication (DFSR) to move data in a one-way direction from the primary location to the secondary location that includes different share names at the primary location and secondary location.

8. The method of claim 1, further comprising using an image that includes one or more of a virtual machine role type, a number of processors to use, a network ID, and a share path.

9. The method of claim 1, further comprising using one or more scripts for one or more of performing configurations of machines in one or more networks, changing settings on previously configured machines, adding a new virtual machine, adding a new database, moving data from one machine to another, moving tenants, and changing schemas.

10. The method of claim 1, further comprising, as a primary network changes, automatically changing a corresponding secondary network to reflect the changes made to the primary network.

11. The method of claim 1, further comprising using mappings between one or more databases, farms, and networks associated with the primary location to one or more corresponding databases, farms, and networks associated with the secondary location.

12. A computer-readable storage medium having computer-executable instructions for establishing and maintaining a recovery service location for a service, comprising:
synchronizing a primary location of a service that is a web-based service that performs jobs for different tenants and maintains data for the different tenants with a secondary location of the service while the primary location of the service is actively receiving requests from users by performing actions, comprising:
creating full backups of databases;
creating incremental backups between the full backups of the databases;
creating transaction logs;
providing the full backups, incremental backups and transaction logs to the secondary location, wherein the transaction logs are replayed at the secondary location;
detecting a network failure of the primary location of the service; and
setting the secondary location of the service as the primary location in response to the network failure, wherein synchronizing the primary location of the service with the secondary location of the service comprises including a time of a backup within a filename for the backup in a sortable format and a read count within the filename when the backup is read at the secondary location that is updated when the backup is read and a name of a database within the filename for the backup.

13. The computer-readable storage medium of claim 12, wherein synchronizing the primary location of the service with the secondary location of the service comprises maintaining tenant data separately from application data for the service.

14. The computer-readable storage medium of claim 12, further comprising establishing mirroring for the secondary location of the service after switching the requests from the primary location to the secondary location.

15. The computer-readable storage medium of claim 12, further comprising verifying an integrity of the synchronization at the secondary location at predetermined times.

16. The computer-readable storage medium of claim 12, wherein synchronizing the primary location of the service with the secondary location of the service comprises using Distributed File System Replication (DFSR) to move data in a one-way direction from the primary location to the secondary location that includes different share names at the primary location and secondary location.

17. A system for establishing and maintaining a recovery service location for a service, comprising:
a processor and a computer-readable medium;
an operating environment stored on the computer-readable medium and executing on the processor; and
a cloud manager operative to perform actions, comprising:
synchronizing a primary location of a service that is a web-based service that performs jobs for different tenants and maintains data for the different tenants with a secondary location of the service while the primary location of the service is actively receiving requests from users by performing actions, comprising:
creating backups including transaction logs of databases;
providing the backups and the transaction logs to the secondary location for replay at the secondary location;
detecting a network failure of the primary location of the service; and
setting the secondary location of the service as the primary location in response to the network failure, wherein synchronizing the primary location of the service with the secondary location of the service comprises storing a time of a backup in a sortable format and a read count indicating when the backup is read at the secondary location that is updated when the backup is read and a name of a database for the backup.

18. The system of claim 17, wherein synchronizing the primary location of the service with the secondary location of the service comprises maintaining tenant data separately from application data for the service.

19. The system of claim 17, further comprising verifying an integrity of the synchronization at the secondary location at predetermined times.

20. The system of claim 17, wherein synchronizing the primary location of the service with the secondary location of the service comprises using Distributed File System Replication (DFSR) to move data in a one-way direction from the primary location to the secondary location that includes different share names at the primary location and secondary location.

* * * * *